United States Patent [19]

Grube et al.

[11] 4,050,899

[45] Sept. 27, 1977

[54] METHOD AND APPARATUS FOR FRAGMENTING CERTAIN SOLID WASTES

[76] Inventors: Kenneth E. Grube, 150 Anchorage Circle; Vincent E. Harrington; James V. Harrington, both of 19 Dolphin Road, all of, Groton, Conn. 06340

[21] Appl. No.: 620,068

[22] Filed: Oct. 6, 1975

Related U.S. Application Data

[63] Continuation-in-part of Ser. No. 429,733, Jan. 2, 1974, abandoned.

[51] Int. Cl.$^2$ .............................................. C05F 9/02
[52] U.S. Cl. ..................................... 23/259.1; 241/2
[58] Field of Search ................... 23/259.1; 241/1, 2, 241/DIG. 9; 162/21, 22, 246, 247; 210/414

[56] References Cited

U.S. PATENT DOCUMENTS

| | | | |
|---|---|---|---|
| 1,383,370 | 7/1921 | Bancroft | 241/DIG. 9 |
| 1,445,742 | 2/1923 | Blair | 241/DIG. 9 |
| 2,633,421 | 3/1953 | Chapman et al. | 241/1 X |
| 2,873,220 | 2/1959 | Brownell et al. | 241/2 X |
| 3,046,183 | 7/1962 | Sutherland et al. | 162/21 X |
| 3,550,775 | 12/1970 | Cooley | 210/414 X |

*Primary Examiner*—Thomas G. Wyse
*Assistant Examiner*—Ferris H. Lander
*Attorney, Agent, or Firm*—Brumbaugh, Graves, Donohue & Raymond

[57] ABSTRACT

Certain solid waste, particularly that comprising trash, rubbish, refuse, garbage, animal and organic remains, and similar materials as is collected from municipalities, is heated and pressurized, preferably with the addition of moisture which saturates those components of the waste which will accepted it, to a suitable temperature and pressure in a pressure vessel. The suitable temperature and pressure are such that the moisture or liquid already in the waste will rapidly turn to steam or vapor at the temperature of the waste when the pressure in the vessel is rapidly reduced. Unloading means at the bottom of the pressure vessel then quickly open. The sudden release of the pressure in the vessel then causes the moisture to change to steam and a certain portion of the liquid in the waste material to flash to vapor in accordance with thermodynamic laws. The resulting rapid expansion within the waste material fragments the waste material. The fragmented waste may be received in a temperature-controlled pit structure where organic fragments of the waste (if any) are rapidly composted (biodegraded) by bacterial action into a stable and inoffensive mass which may be disposed of, for example, as land fill or, after separation from non-compostable solids and either with or without the addition of other nutrients and chemicals, as fertilizer.

4 Claims, 7 Drawing Figures

METHOD AND APPARATUS FOR FRAGMENTING CERTAIN SOLID WASTES

BACKGROUND OF THE INVENTION

This application is a continuation-in-part of copending U.S. pat. application Ser. No. 429,733, filed Jan. 2, 1974, and now abandoned.

Solid waste may be either substantially homogeneous material such as animal remains from a meat processing operation or substantially inhomogeneous material such as results from typical waste collections from municipalities. This invention is applicable to both types of solid wastes when at least in part amenable to fragmentation by the method and apparatus herein disclosed.

There has been a rapid increase in the per capita output of solid waste material as a result of the increasing affluence of our society, the increase in the amount of packaging material supplied with consumer and other products, and the general increase in the population being provided with goods. At the end of their useful lives these goods are disposed of, generally to municipal waste collection facilities provided by a majority of the local governments in the nation. Municipal waste is either disposed of by burial in a landfill type of operation, or by incineration. In either instance the waste material serves no further useful purpose; in the one instance it merely occupies space of relatively low value, and in the other instance it is dispersed to the atmosphere as combustion products which contribute to a level of air pollution which is particularly objectionable in areas of large population.

SUMMARY OF THE INVENTION

It is an object of the present invention accordingly to provide new and improve means for the treatment and disposal of solid waste.

A further objective of the invention is to reduce a significant percentage of this waste to a useful and recoverably end product which will be socially and economically beneficial to the community.

Still another object of the invention is to eliminate the discharge or products of combustion caused by incineration of a variety of materials such as plastic containers, paint products and other unknown substances into the atmosphere.

One further objective of the invention is to provide a solid waste disposal system which requires minimal handling of material in the raw condition as it arrives at the processing (dump) site.

A further objective of the invention is to sterilize the material entering the composting process so that preferred strains of bacteria may be employed in the composting process.

Another objective of the invention is to carry out the composting process at the dump site in an enclosed pit which will give effective vermin control.

Another objective of the invention is to simplify the separation of elements of solid waste by providing sensibly inoffensive composted residue of graded size to the separation equipment.

A further objective of the invention is the reduction of volume (estimated as approximately 40%) of biodegradable material being processed during the composting process.

Another objective of the invention is to reduce the free energy content of the composted and separated material to a level where land fill cover will not be required. The danger of fire and its associated air pollution problems in the dump site is minimized, if not eliminated entirely.

These and other objectives are attained by placing the waste material in a pressure vessel unit which has a quick opening, unloading means such as a hatch at the bottom of the unit. With the waste in the vessel and the hatch closed and sealed shut, the contents are brought to a predetermined pressure and temperature, preferably with the addition of moisture, such that the moisture will turn to steam or certain liquids which may already be in the waste will turn to vapor rapidly or explosively when the pressure is rapidly reduced as is known from thermodynamic laws.

The pressure is reduced by quickly opening the unloading means, thereby allowing the sudden explosive decompression of the contents of the unit which rapidly expells it from the unit. In the process of decompression and explusion, the moisture and a certain portion of other liquid contained in the material will flash to steam and vapor in accordance with thermodynamic laws, for example the proportion of moisture flashing being in accordance with the amount of heat pressure in excess of the heat required to maintain water at 212° F (100° C) at atmospheric discharge pressure.

This sudden flashing of water to steam, with its accompanying large increase of volume will rupture certain waste material into tiny fragments. Exceptions, of course, will be metallic and other materials which will not absorb or contain water or other liquids under these conditions and which therefore will remain substantially intact, although closed containers may rupture and glass shatter.

The precise effect of the invention as so far described will depend upon the solid waste material with which the invention is being practiced. Thus, for homogeneous waste, all the waste may be fragmented (the invention, of course, not being practiced with waste which will not be fragmented) whereas for inhomogeneous waste, such as that from municipalities, only a portion may be fragmented.

In one representative embodiment of apparatus for practicing this invention, the pressure vessel is an autoclave which, as usually defined, is a device which uses superheated steam. The autoclave has a hatch at the top for loading the waste into the autoclave. For example, municipal waste may be dumped through the hatch directly from collection vehicles. Superheated steam is then admitted to the autoclave from a boiler for simultaneously heating and pressurizing the contents to a desired temperature and pressure and adding moisture to the contents.

The desired temperature and pressure for the contents of the autoclave is such that at least the moisture added to the contents by the steam will rapidly return to steam when the pressure on the contents of the autoclave is rapidly reduced. When the temperature and pressure of the contents of the autoclave have reached this desired pressure and temperature as determined by a pressure control valve between the boiler and autoclave, the flow of steam into the autoclave will drop substantially to zero, thereby providing a convenient way of determining that the contents have reached the desired pressure and temperature.

The pressure is then rapidly reduced by quickly opening an unloading hatch at the bottom of the autoclave to, for example, the atmosphere. The temperature of the contents of the autoclave then merely has to be at or slightly above 212° F (100° C) for the moisture in the contents to turn to steam. The resulting explosive decompression of the contents of the autoclave expels the contents through the unloading hatch and fragments at least the moisture saturable components of the waste. Closed containers may also rupture under the pressure differential rapidly produced across the containers and glass may shatter under the explosive discharge from the autoclave as well as from the thermal gradient through the glass as it cools from the temperature of the autoclave, which cooling is made more rapid by the change of moisture on the surface of the glass to steam.

This description of a representative embodiment of apparatus for practicing the invention has thus further indicatd that the waste materials with which the invention has particular utility are waste materials which comprise components which are moisture saturable, are closed containers, or are glass. A review of the following table of typical solid waste from a municipality will indicate that such materials constitute a substantial proportion of such solid waste.

TABLE I

REFUSE BREAKDOWN CITY COLLECTION ONLY

| | Percentage range by dry weight | |
|---|---|---|
| Cardboard | 3.9 | 4.3 |
| Newsprint | 9.3 | 9.7 |
| Other paper | 38.7 | 39.2 |
| Yard trimmings | 11.9 | 16.0 |
| Wood | 0.6 | 1.3 |
| Rags/Cloth/Leather/Bedding | 2.4 | 2.6 |
| Tires | 0.1 | 0.2 |
| Other rubber | 0.1 | 0.2 |
| Plastics | 2.2 | 2.1 |
| Garbage | 2.0 | 2.1 |
| Ferrous cans | 5.6 | 6.3 |
| Ferrous metal | 0.9 | 1.2 |
| Aluminum cans | 0.5 | 0.6 |
| Other aluminum | 0.1 | 0.2 |
| Glass | 6.2 | 7.5 |
| Remainder* | 8.9 | 12.2 |

*Remainder is that portion of the refuse consisting of dirt, rocks, badly contaminated paper, etc.

The above table of typical municipal waste further indicates another advantage of the invention over incineration, a conventional way of treating such waste. Table II below identifies the minimum percentage of the total waste of each material identified in Table I and a corresponding typical specific heat for these materials.

TABLE II

| | Minimum Per Cent | Specific Heat |
|---|---|---|
| Cardboard | 3.9 | 0.55 |
| Newsprint | 9.3 | 0.55 |
| Other paper | 38.7 | 0.55 |
| Yard trimmings | 11.9 | 0.75 |
| Wood | 0.6 | 0.55 |
| Rags, cloth, leather | 2.4 | 0.55 |
| Tires | 0.1 | 0.34 |
| Rubber | 0.1 | 0.34 |
| Plastics | 2.2 | 0.34 |
| Garbage | 2.0 | 1.0 |
| Ferrous Cans | 5.6 | 0.11 |
| Ferrous Metal | 0.9 | 0.11 |
| Aluminum Cans | 0.5 | 0.225 |
| Other Aluminum | 0.1 | 0.225 |
| Glass | 6.2 | 0.2 |
| Remainder | 8.9 | 0.2 |

From the percentage composition and specific heats identified in Table II, a weighted average specific heat of the waste from a municipality may be computed as 0.458. Then, assuming a temperature differential between the temperature of the waste material in the pressure vessel or autoclave and that into which it is discharged from the vessel of 220° F (110° C) and a total thermal efficiency of 45% for raising the contents of the pressure vessle to the desired temperature, the energy for treating each pound of such waste according to the invention may be computed as 223 BTU per pound. Even generously rounding this energy requirement to about 300 BTU per pound, this requirement will be seen by those in the art to compare favorably with the energy required for incineration of such waste which may range to about 1,000 BTU per pound.

Steam is a preferred way of heating the contents of the pressure vessel because the heat transfer rates in the condensation of steam are extremely high to thereby permit rapid heat transfer to the contents of the pressure vessel and correspondingly rapid cycling of the pressure vessel unit through the heating step of the invention. The use of superheated steam in a pressure vessel such as an autoclave is particularly preferred because the higher temperature of superheated steam at any pressure gives still greater heat transfer rates between the steam and the contents of the pressure vessel without requiring the higher pressure required at the same temperature if the steam is only saturated from the greater initial difference between the temperature of the contents and the higher temperature of the superheated steam. Steam is also preferred because it adds moisture for saturating susceptible components of the waste for fragmenting them upon decompression.

It will be recognized from the description of the invention, that these ways of practicing the invention are only preferred. For example, one preferred embodiment is later described in which electric heating elements (rather than steam from a boiler) heat the contents of a pressure vessel.

Suitable pressures within the pressure vessel are well within the range of pressures for which vessels may be readily designed. These pressures are in a range of from 1 to about 3 atmospheres (absolute) with about 15 lbs. per sq. in. (1.1 kg/cm.$^2$) above atmospheric pressure or about 2 atmospheres (absolute) being preferred. Standards for the design of such pressure vessels have been set forth by the American Society of Mechanical Engineers and are well understood by those in the art. The relatively low pressure at which the pressure vessel operates provides an advantage to the invention over other apparatus such as grinders for fragmenting waste material for which specially trained operators may be required in that operators for vessels at the pressures described are already trained and licensed in most localities.

The invention has further advantage over other apparatus such as grinders for treating typical municipal and like solid waste. Such grinders require substantial maintenance because the metallic and similar hard components of the waste often damage grinding elements in such apparatus. Repair or replacement of the grinding elements is made more difficult and unpleasant by the obviously offense residue of the material left on the apparatus. In contrast, the apparatus described for this invention has no moving members such as grinding elements which must interact with the solid waste and therefore no elements which are particularly subject to damage by metallic or other components of the waste. Moreover, the temperature to which the waste material is raised in the pressure vessel (at least 212° F (100° C) for waste discharged to atmospheric pressure) substantially sterilizes the waste material in the pressure vessel so that any residue left in the vessel after the explosive decompression is sensibly inoffensive and any maintenance on the pressure vessel is thus significantly less unpleasant.

In one form of the invention, it is further contemplated that fragmented waste material which is expelled from the pressure vessel by the explosive decompression upon quickly opening the unloading means of the pressure vessel may be composted or biodegraded to convert organic components of the waste material to more basic forms. In smaller operations, the material may be retained in a pile where composting will proceed at a slower rate largely dependent upon weather conditions. In larger operations, however, the invention may further comprise means defining a pit beneath the pressure vessel, which pit may be particlarly adapted for permitting more rapid composting of the waste material.

The pit structure may have a temperature control using, for example, heated air passed through the material in the structure or heated walls of the structure which defines the pit. The pit may also have means for agitating the material therein which, depending upon the size of the pit, may be a number of discharge loads from the pressure vessel. A suitable size for the pit is, of course, determined upon the rate of composting so that fully composted material can be removed from the bottom of the pit.

Particularly with this practice of the invention in which the fragmented waste is discharged into a structure defining a pit, further means may be provided for introducing selected strains of bacteria for furthering the composting step or particular chemicals which will enhance the composted product as, for example, a more desirable fertilizer. These steps of adding bacteria or other chemicals to the waste may be carried out either while the material is in the pressure vessel or while the material is being composted. Preferably, chemicals are added to the material while the material is in the pressure vessel for dispersing the chemicals throughout the material with the explosive decompression whereas bacteria are added to the waste material during composting to keep the bacteria from being affected by the temperature in the pressure vessel. With the addition of suitable bacteria to the typical municipal waste identified in Table I, and with suitable conditions of temperature, moisture, and air provided by means in the structure defining the composting pit, a reasonable estimate of the time for complete composting of the waste material is about 4 days The size of the pit, or each of several pits, which will receive the waste material from a municipality of substantial size is thus well within reasonable limits of construction.

BRIEF DESCRIPTION OF THE DRAWINGS

For an understandng of further particulars of the invention, reference may be made to the following detailed description of a representative embodiment thereof and to the accompanying drawings in which.

DESCRIPTION OF THE PREFERRED EMBODIMENTS

A first embodiment of the invention is shown in FIGS. 1-7. Other arrangements of parts and other details of construction will accomplish like results, resulting in other embodiments such as that shown in FIG. 8 which are also within the scope of the invention. The invention presented in the first embodiment is the combination of a comminuting device operating on the principal of sudden thermal expansion of an enclosed and heated liquid to vapor, and an associated specially devised pit structure which receives the discharge of the comminuting device and maintains the discharge in optimum condition for most effective composting of its biodegradable parts. The apparatus is specifically intended for the processing of solid wastes received from municipal waste collection activities.

The method of treatment by this apparatus yields a product which is directly amenable to complete and effective separation as shown in our copending U.S. patent application Ser. No. 451,087, filed Mar. 14, 1974 and titled "A System For The Separation of Fragmented Solid Waste." This copending applications considers the advantage gained in separation systems as a result of providing the separation equipment with material treated as described herein. The condition of material treated as described herein assures that the separating machinery handling it will remain in a sensibly clean condition which will reduce corrosion and sealing problems and facilitate maintenance.

Figure 1:
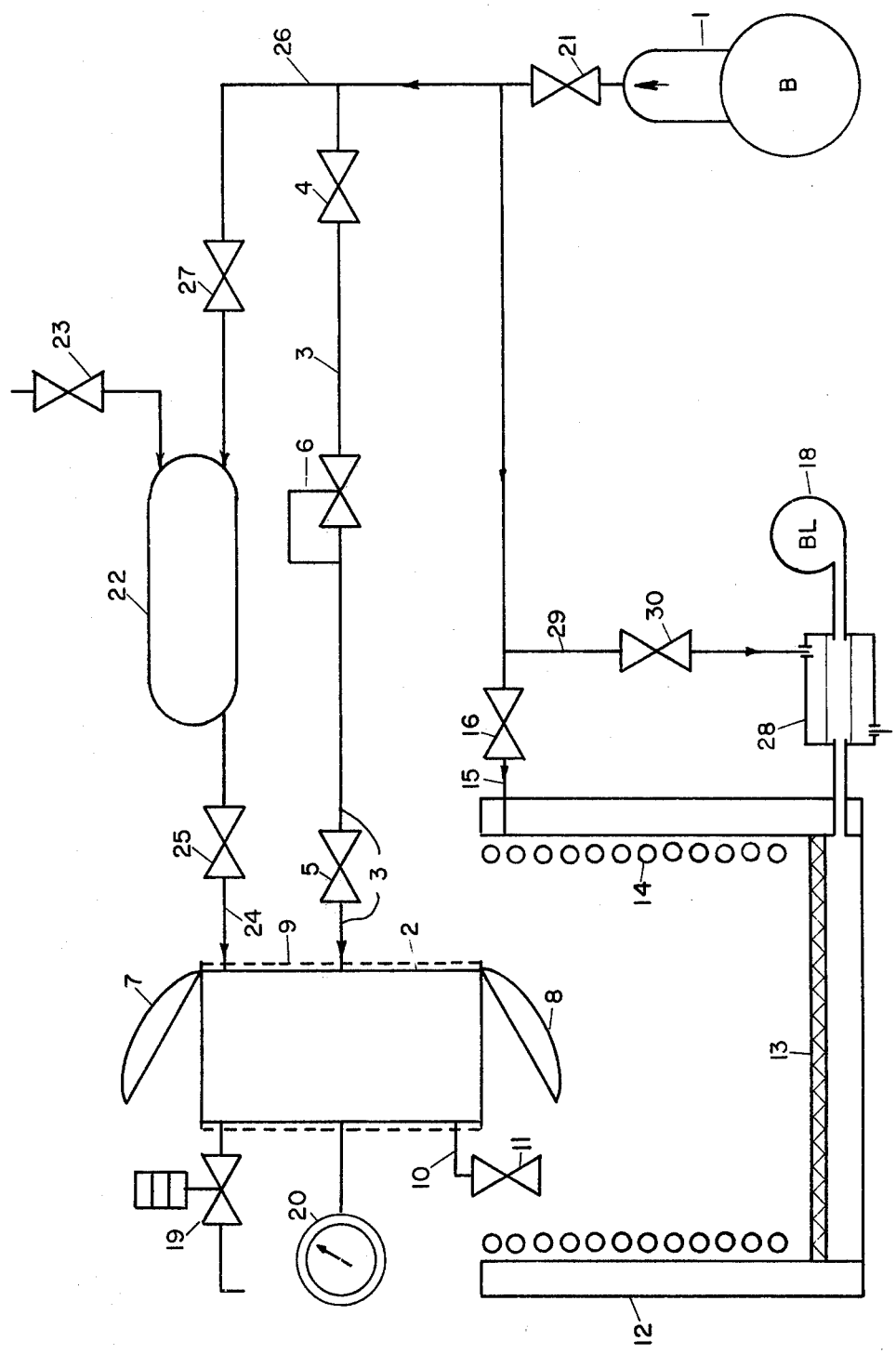
FIG. 1 is a schematic drawing showing the principal components of the invention and the interrelationships between them in one embodiment of the invention.

In FIG. 1, a boiler 1 is shown supplying steam to an autoclave or pressure vessel unit 2 through a steam line 3, stop valves 4, 5, 21 and a pressure reducing valve 6 which (as is known) also inherently superheats the steam passing therethrough. When steam is being supplied to the unit, a loading hatch or door 7 at the upper end of the pressure vessel and a quick opening hatch or door 8 at the lower end of the pressure vessel are closed, forming a pressure tight boundary for the vessel, the direction from door 7 to door 8 being generally downward. The loss of heat from the vessel is minimized by an insulation jacket 9.

At the end of the heating cycle, the contents of the unit are discharged through either the quick opening lower door 8 (or through a discharge pipe 10 and discharge valve 11 as more fully described with later reference to FIG.2) to a containing device defining a pit 12. One embodiment of a containing device may be a circular vat of masonry construction with a grate 13 at its lower end to support the weight of the contents, heating coils 14 supplied with steam from boiler 1 through pipe 15 and valves 16, 21 along its sides for controlling the temperature in the pit, and blower device 18 and heat exchanger 28 which also receives steam from boiler 1 via line 29 and valves 21, 30 for supplying heated air to the bottom of the pit beneath grate 13. The purpose of controlling the temperature in the pit is to maintain material in it at the optimum temperature for bacterial activity of a composting process. The purpose of the blower is to insure an adequate air supply for this aerobic bacterial process.

Other embodiments of a containing device are an excavated pit or an exposed pile of material in which bacterial action may proceed. Other embodiments of heating means for the composting step consist only of heating the discharge air from blower 18 before it passes through the bed of material. This would be done using a heat exchanger 28 and steam from the boiler through pipe 29 and isolation valve 30.

A relief valve 19 is provided to protect the pressure vessel 2 from over-pressure and a gauge 20 is provided to indicate the pressure vessel operating pressure. A stop valve 21 is provided to isolate the boiler from the balance of the system.

A means for injecting chemicals which might be beneficial to the process, such as for the breakdown of plastic materials as one example, is provided, one embodiment consisting of a tank 22, a tank filling connection 23, a charging pipe 24 and charging pipe stop valve 25 for charging the contents of tank 22 into pressure vessel 2. The pressure required for charging is obtained from the boiler through pipe 26 and controlled by isolation valve 27.

Figure 2:
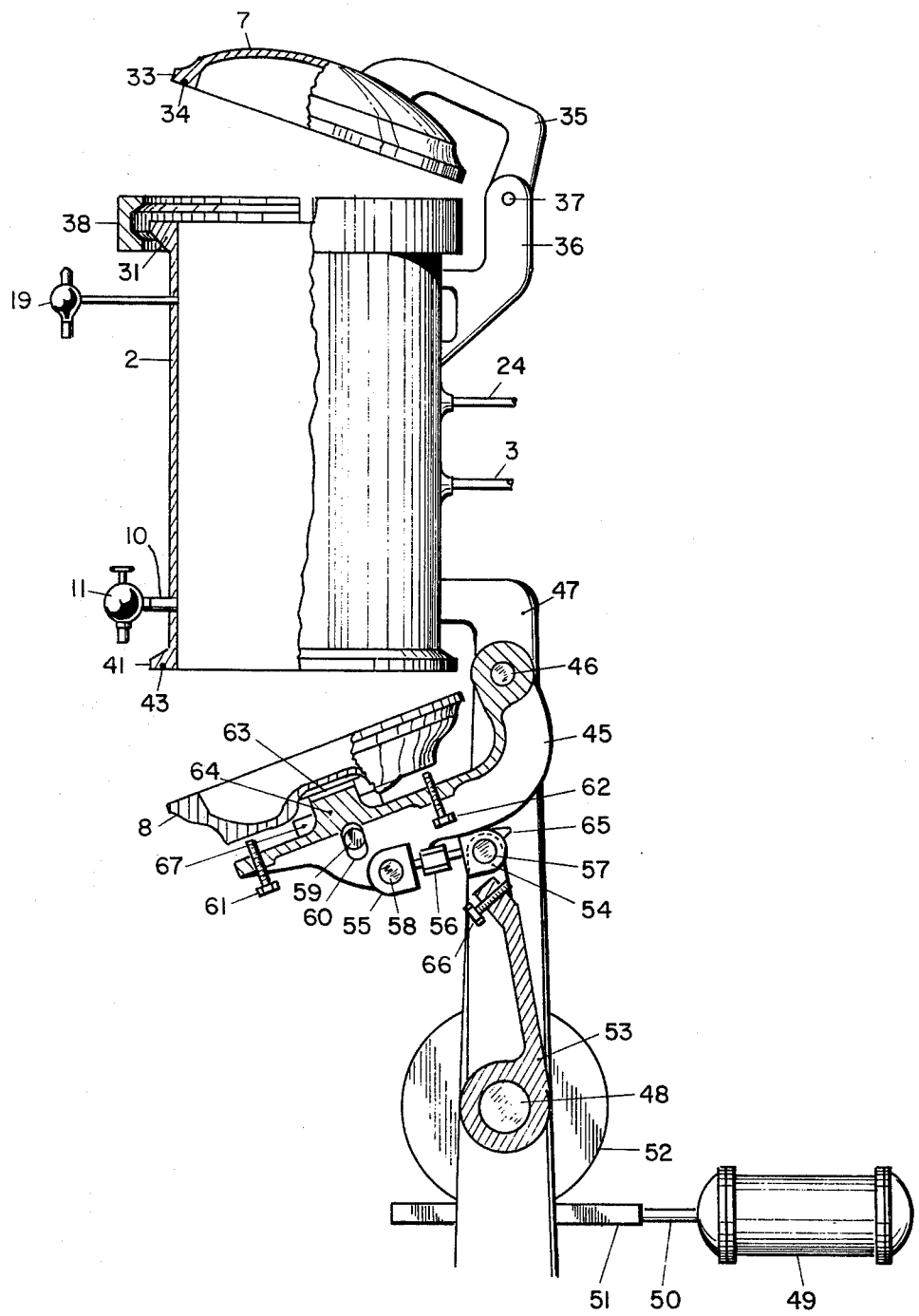
FIG. 2 shows the assembly and operation mechanism of the autoclave or pressure vessel, involving the upper cover locking mechanism and the lower cover quick opening, closing and locking mechanism in one embodiment of the invention.

FIG. 2 shows one embodiment of a pressure vessel assembly capable of functioning to cause vapor explosive decompression of solid waste materials. It consists of a cylindrical vessel portion 2 with flanges 31 and 41 at each end. The upper end is closed by the loading hatch or cover 7 having a flange 33 and a seal ring 34 which prevent the escape of vapor when the interior of the vessel is pressurized. The cover 7 is supported and attached to the pressure vessel by a hinge mechanism consisting of an upper bracket assembly 35 and a lower bracket 36 fixed to the cylindrical portion of the pressure vessel. The two brackets are held in rotational relationship by hinge pin 37. The cover 7 is held closed and sealed to the flange 31 by means of a split clamp ring 38 which wedges them together when the clamp ring is closed. The combination of flanges 31 and 33, clamp ring 38 and seal 34 form a vapor tight and pressure resistant upper end closure for the pressure vessel when properly engaged in the closed position.

The cylindrical portion of the pressure vessel 2 is penetrated by piping 3 for the admission of vapor, injection of chemicals through pipe 24, drains 10, relief valve 19 and for such other purposes as may be desired.

The lower end of the pressure vessel 2 terminates in flange 41 containing seal ring 43. The quick opening hatch or lower cover 8 supported by hinged arm 45 rotating about hinge pin 46 seals the lower end of the pressure vessel to form a vapor tight enclosure during the heating and pressurizing cycle. A structural element 47 attached to the pressure vessel supports hinge pin 46 and serves to maintain positional alignment between a drive shaft 48 and the driving parts.

Lower cover 8 is power driven to the opened and closed positions through an angle of 90° to 100°, being shown in FIG. 2 in the partially opened position. One embodiment of power driving apparatus consists of a hydraulic cylinder 49, piston rod 50 and rack mechanism 51 driving bull gear 52, although other hydraulic, pneumatic or electrical driving apparatus would be equally suitable for the purpose. Bull gear 52 and rotating arm 53 are both keyed or splined to drive shaft 48 causing them to rotate together as an assembly. The upper part of arm 53 terminates in a pinned connection to a turnbuckle link. Said turnbuckle link consists of left hand threaded eyebolt 54, right hand threaded eyebolt 55 and turnbuckle nut 56. The turnbuckle link is rotatably connected to hinge arm 45 by pin 58. The operation of cylinder 49 causes rotation of arm 53 pushing or pulling the turnbuckle assembly to cause rotation of hinge arm 45 and pin 46 carrying the cover 8. This assembly permits rapid opening and closing of the cover 8.

Hinge arm 45 carries and supports cover 8, keeping it captive while permitting relative rotary and translational movement between them for purposes of alignment and proper seating in the closed position of cover 8 on flange 41 and seal ring 43.

The cover 8 has ears 67 normal to its outer surface which carry pin 59. This pin passes through a slotted hole 60 in hinge arm 45, allowing relative translative motion in the direction and to the limits of the slotted hole. The cover 8 and pin 59 may also rotate in the said slotted hole, being restrained in the rotary movement by stop bolts 61 and 62 carried in hinge arm 45. A left spring 63, supported on its ends by supports on the cover, may be compressed by a nose portion 64 on hinge arm 45 which bears on the center of the spring. When the cover 8 is suitably seated on flange 41, continued rotation of the driving arm 53, turnbuckle and hinge arm 45 causes pin 57 to pass through dead center, compressing spring 63 to an amount which may be adjusted by the setting of turnbuckle nut 56 operating in conjunction with the eyebolts 54 and 55.

Figure 3:
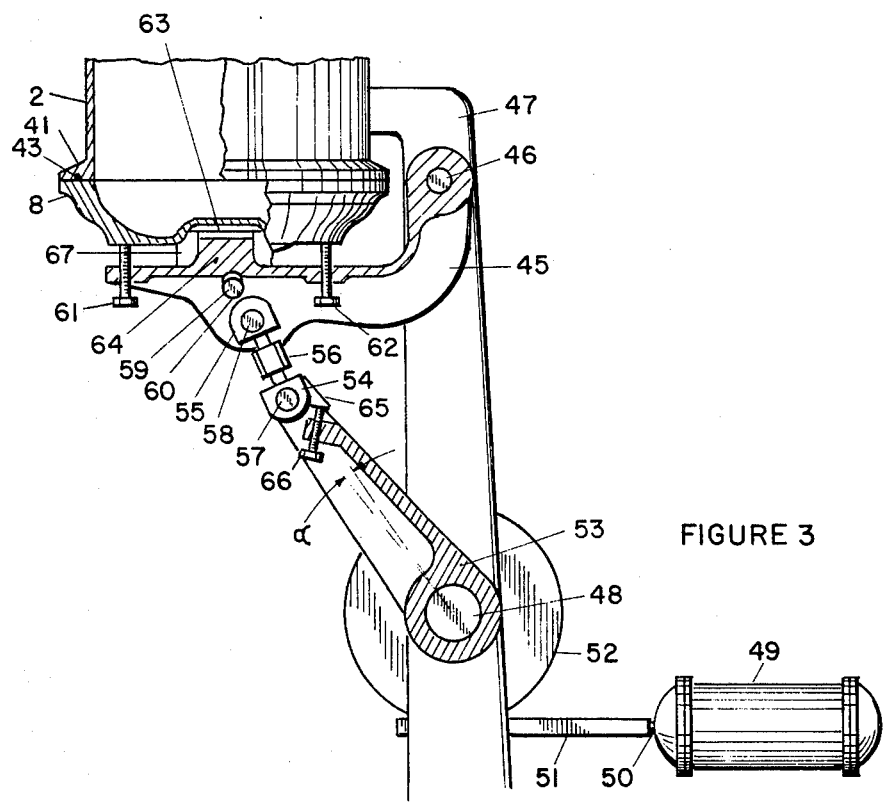
FIG. 3 shows the lower cover in the closed and locked position for the same embodiment of the invention.

FIG. 3 shows the lower cover drive operating mechanism in the closed position. This mechanism serves several functions. It provides the necessary flexibility for the cover 8 to align itself properly in relationship to lower pressure vessel flange 41 and lower seal 43. It provides a locking mechanism for cover 8 in the closed position by virtue of passing beyond dead center by a fixed angle, after which fixed face 65 on eyebolt 54 contacts stop bolt 66 fixed to driving arm 53, thereby preventing further rotation away from the top position past dead center. The mechanism is now locked by internal forces in this position until the driving mechanism consisting of cylinder 49, rod 50 and rack 51 rotate bull gear 52, arm 53 and shaft 48 in the direction tending to open the cover 8.

The force seating cover 8 on flange 41 is controlled by the deflection of leaf spring 63, and this force must be sufficient to carry the deadweight of the contents of pressure vessel 2, plus the load resulting from the pressure in the pressure vessel, plus a sufficient excess force to insure proper seating of the cover 8 on seal ring 43. Adjustment of the deflection of the spring to attain the proper seating force is accomplished by extending or shortening the length of the turnbuckle link consisting of eyebolts 54 and 55, and turnbuckle nut 56. The rotation of turnbuckle nut 56 in the appropriate direction will result in the desired change in length. The desired angle by which the mechanism extends beyond the dead center position is controlled by the position of stop bolt 66 as it bears on face 65. The degree of rotation afforded between cover 8 and hinge arm 45 in the plane of FIG. 3 is controlled by the setting of stop bolts 61 and 62.

Figure 4:
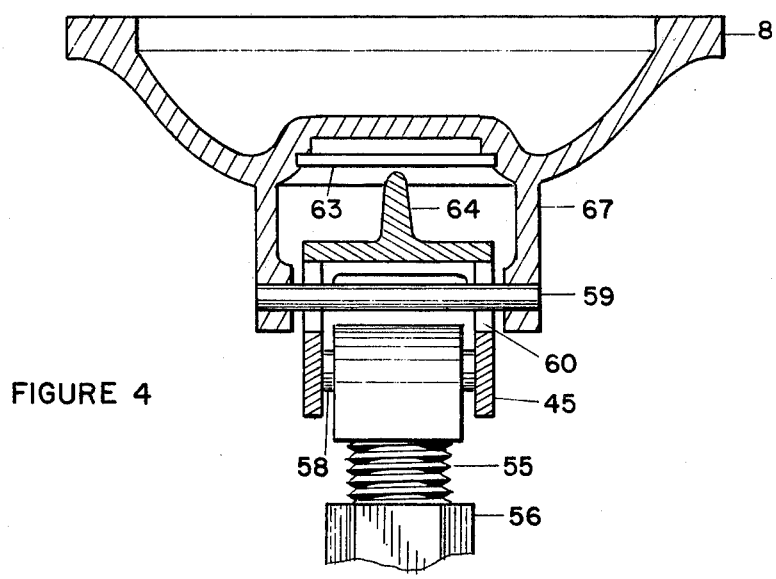
FIG. 4 shows the cross section of the lower cover transverse to the views shown in FIGS. 2 and 3 for this embodiment of the invention.

FIG. 4 shows a cross sectional view of the lower cover 8 and associated parts in a view normal to that shown in FIGS. 2 and 3. This view serves to show another aspect of the assembly including spring 63 and cover support ears 67. Slotted hole 60 in the hinge arm 45 through which cover support pin 59 extends is shown. The clearance shown between ears 67 and hinge arm 45 permits restrained rotation of cover assembly 8 and ears 67, spring 63 and pin 59 with respect to arm 45 to permit adjustment of the cover 8 on the previously shown flange 41 in FIG. 3.

Nose portion 64 on hinge arm 45, which serves to control spring 63 deflection is also shown. Hinge arm 45 and associated driving mechanism, comprising eyebolt 55, pin 58 and turnbuckle nut 56, partially shown in FIG. 4, completes this view of the cover and operating mechanism assembly.

Figure 5:
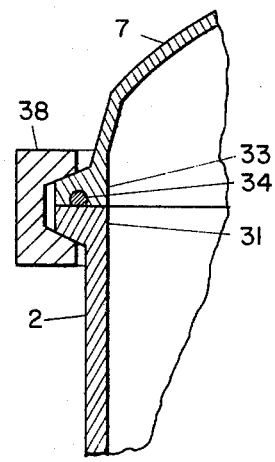
FIG. 5 is a cross sectional view through the upper cover locking mechanism in this embodiment of the invention.

FIG. 5 shows one embodiment of a closure for the upper cover 7, held in pressure tight engagement with pressure vessel upper flange 31, seal ring 34 and cover flange 33 locked together by the wedging action of clamp 38 which bears on the said flanges.

Figure 6:
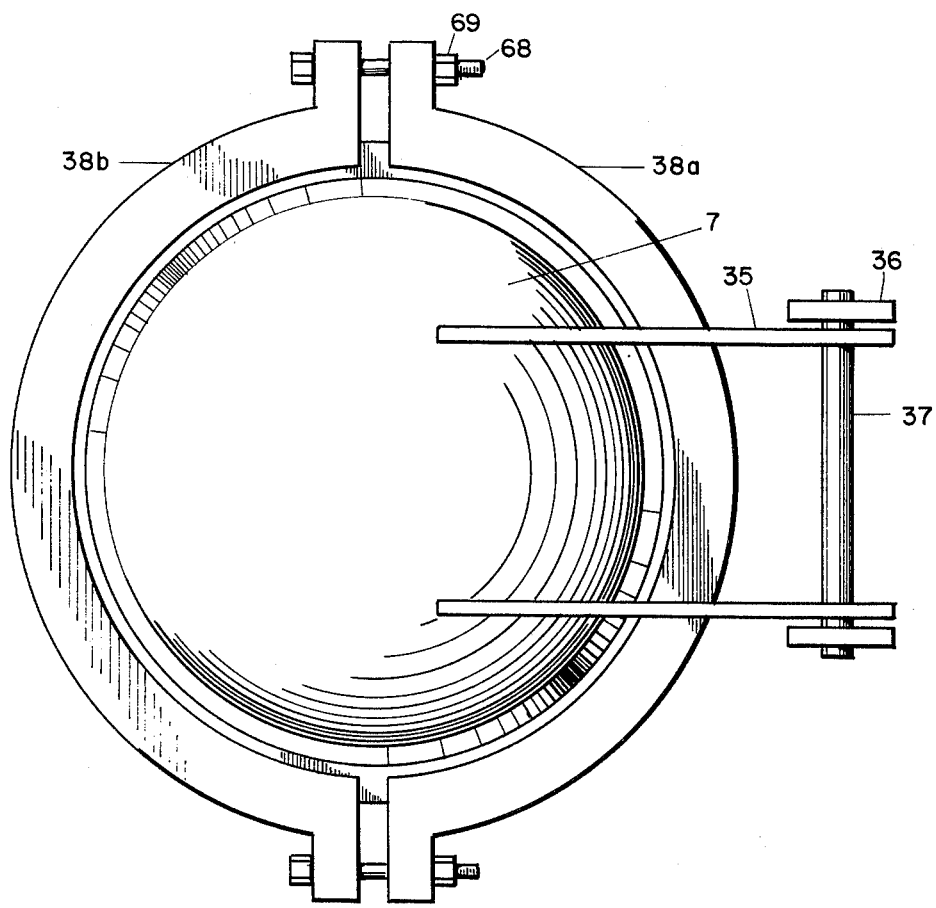
FIG. 6 is a plan view of the upper cover and locking mechanism in this embodiment of the invention.

FIG. 6 shows a plan view of the upper closure in which upper clamp 38 is split into two halves 38a and 38b. The clamp may be tightened into wedging position over the flanges by the use of bolts 68 and nuts 69. In larger installations, a powered split ring clamp may be substituted for the manually operated bolting arrangement.

Figure 7:
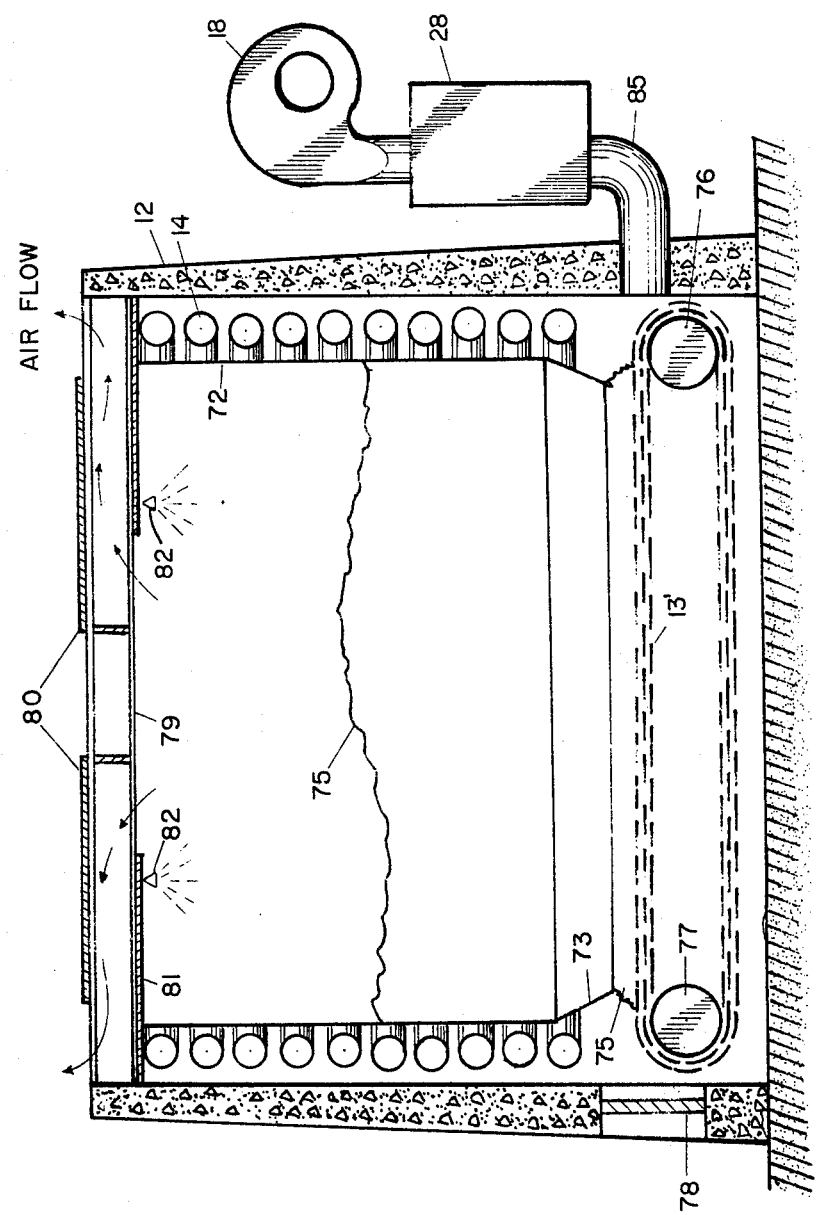
FIG. 7 is a cross sectional view of the composting pit and the structures and equipment associated therewith.

FIG. 7 shows the arrangement of equipment in one embodiment of a composting pit. While this pit is not necessary in small and infrequently used installations for the purpose of causing the waste material to be processed by composting, it will expedite the process in larger and more frequently used installations. This pit will augment the composting process by maintaining proper temperature control of the contained material to provide optimum conditions for bacterial action and growth. It is well-known that composting bacterial action is more effective when temperatures are properly maintained. The pit also serves other functions such as containment to prevent scattering of the processed waste by wind or by the explosive decompressive process. It also will direct the steam from the process in controlled directions rather than permitting it to flow over the surrounding area. It will reduce the noise of the explosive decompression process by reducing the velocity of gas streams venting to the atmosphere; they may be expelled through appropriate baffles on the pit structure. It will assist in the handling and expelling of the composted product when fitted with a movable grate 13' which will result in a stoker-type action, expelling the final product from the bottom of the pile of composting material. It will be recognized that these features become increasingly important as the volume of material handled increases and as the proximity of habitation and traffic to the work site becomes closer.

FIG. 7 shows one embodiment of the pit which consists of an exterior concrete or steel shell 12 surrounding heating coils 14 and an internal baffle 72 formed into a funnel-shaped configuration 73 at its lower end to insure placement of the waste material on the conveyor-grate 13'. Waste material 75 is maintained at a level suitable to give it time to compost as it migrates from top to bottom of the pile.

Conveyor belt grate 13' is mounted on driving sprockets 76 and 77 at each end of the belt which are motor driven to cause the carrying of the processed material in the direction of door 78 from which it may be removed from the pit.

The upper end of the pit is attached to frame structure shown in this embodiment as an I-beam frame 79 capable of supporting the pressure vessel 2 (shown in FIG. 1), its hatch-closing mechanisms, the weight of its contents and such other apparatus as is contained on the vessel. This frame must also support the reaction loading from the process of the explosive decompression.

Also provided is an upper deck plate 80 and a lower baffle plate 81 which provides an exhaust vent for the steam during the explosive decompression process. Sprinklers 82 on plate 81 serve to introduce chemicals or bacteria-laden fluids to enhance the process or the product being composted. Air for enhancing the action of aerobic bacteria is introduced by blower 18 and heat exchanger 28 through ducting 85.

It may be noted that material handling devices such as loading and unloading conveyors, instrumentation, remote operating consoles, remote power operation of upper and lower hatch operating gear and similar appurtenances, or change in the detailed configuration of various parts of the invention may from time to time be added to improve the convenience, safety, speed and economy of operation. Accordingly, the invention is to be construed as including all of the modifications which fall within the scope of the appended claims.

DESCRIPTION OF OPERATION

Trash, rubbish, refuse, garbage, animal and organic remains as normally received from municipal collections are mixtures containing material comminutable and non-comminutable by the process of thermal explosive decompression. This material, as received, is loaded directly into pressure vessel 2. The material is charged through the upper loading hatch 7, the lower unloading hatch 8 being in the closed and sealed condition during the loading operation. When the pressure vessel 2 has been filled to its operating level, upper hatch 7 is closed and sealed. Steam from boiler 1 flows through isolation valves 21 and 4, pressure reduction valve 6, isolation valve 5, and pipe 3 entering pressure vessel 2, heating the contents and sterilizing them, and further saturating those parts which will absorb water, particularly biodegradable material with its cellular structure.

Pressure reducing valve 6 permits selection of a saturated steam boiler 1 operating at a pressure higher than that needed for the process, thereby providing a higher temperature for sterilization and heat transfer in the pressure vessel 2 without subjecting said vessel to higher than necessary pressure for the process, which would thereby increase the structural strength requirements of the vessel and the piping and valves beyond the boiler and reducing valve. At the reduced pressure, the steam is, of course, superheated. The loss of heat from the vessel is minimized by the insulation jacket 9.

A tank 22 is isolatable from the atmosphere by valve 23, isolatable from the boiler 1 by valve 27 and isolatable from pressure vessel 2 by valve 25. With valve 23 open and valves 27 and 25 shut, tank 22 may be filled through the line containing valve 23 with chemicals which will benefit the process in the pressure vessel.

With valve 23 shut and valves 25 and 27 open the steam from boiler 1 will force the contents of tank 22 into pressure vessel 2 through pipe 24. During heating the pressure in the pressure vessel 2 is indicated by gauge 20, while relief valve 19 protects the tank from excess pressure and drain line 10 and stop valve 11 serve as a means for quickly reducing pressure in the pressure vessel without discharging its contents.

At the end of the heating cycle, determined when the pressure stabilizes at the setting of the pressure regulator valve without significant flow of steam, quick opening hatch 8 is opened and the contents of pressure vessel 2 are discharged to the containing device 12 defining the pit. During the rapid discharge process the pressure on the contents of the vessel drops to atmospheric and all material such as that of a cellular nature which contains water or certain sufficiently volatile liquids at the closed pressure vessel conditions of temperature and pressure will be comminuted. This results from the contained water or liquid flashing to steam or vapor, increasing in volume, and rupturing the material in the expansion process.

Brittle materials such as glass which are sensitive to the effect of thermal gradients will rupture as the moisture on the surface cools as a result of flashing to steam at atmospheric conditions. This results in a glass surface temperature significantly below the temperature through the structure, placing the surface layers in tension and propagating cracks which will fracture the glass.

Devices which are made from metals, solid plastics, rubber and other materials which are not comminuted by this process will pass through the pressure vessel in substantially unaltered condition. Lower hatch 8 is sufficiently large to pass the largest object that is acceptable for the process, there being no intention to process items normally categorized as junk, such as stoves, refrigerators, cars or other items of like substantial size and material not accepting water or containing liquids. The vertical orientation with upper and lower hatches is necessary to use the benefits of gravity in loading and particularly unloading the pressure vessel, since nonporous material of high density may not be effectively ejected by the expansion of the steam alone. An orientation of the vessel with a vertical axis and a hatch at the bottom permits such objects to fall out, eliminating the need for other cleaning operations.

The material which lands in pit 12 enters in a sterile condition and is immediately sprayed by sprinklers 82 (FIG. 7) with a preferred strain of bacteria which will optimize the composting of the biodegradable parts of the pit contents. Non-compostable elements will pass through the pit in a substantially unaltered condition and be discharged at the end of the composting process.

The pit 12 is sized to contain a number of loads from pressure vessel 2, and each load discharged will land on top of the load discharged in the last cycle, thereby causing successive layers of discharged material to build up over grate 13, each layer in turn being sprayed with selected bacteria. The rate at which composting takes place in the pit is governed by the nature and quantity of bacteria, the ratio of surface area to volume in the biodegradable mass of material, the temperature which is maintained throughout the mass, and a proper level of aerating, moisture, and agitation of the mass.

Temperature is maintained throughout the mass by the heating coils 14 around the periphery of the mass which, when heated with steam from boiler 1 as before described, acts as a thermal buffer against heat loss through the side walls of the pit. Blower 18 provides atmospheric air through heat exchanger 28, which combination provides aeration at a suitable temperature throughout the mass. Agitation is accomplished by grate mechanism 13' (FIG. 7) during the process of discharging the lowest layer of material from the pit.

DESCRIPTION OF ANOTHER PREFERRED EMBODIMENT

Figure 8:
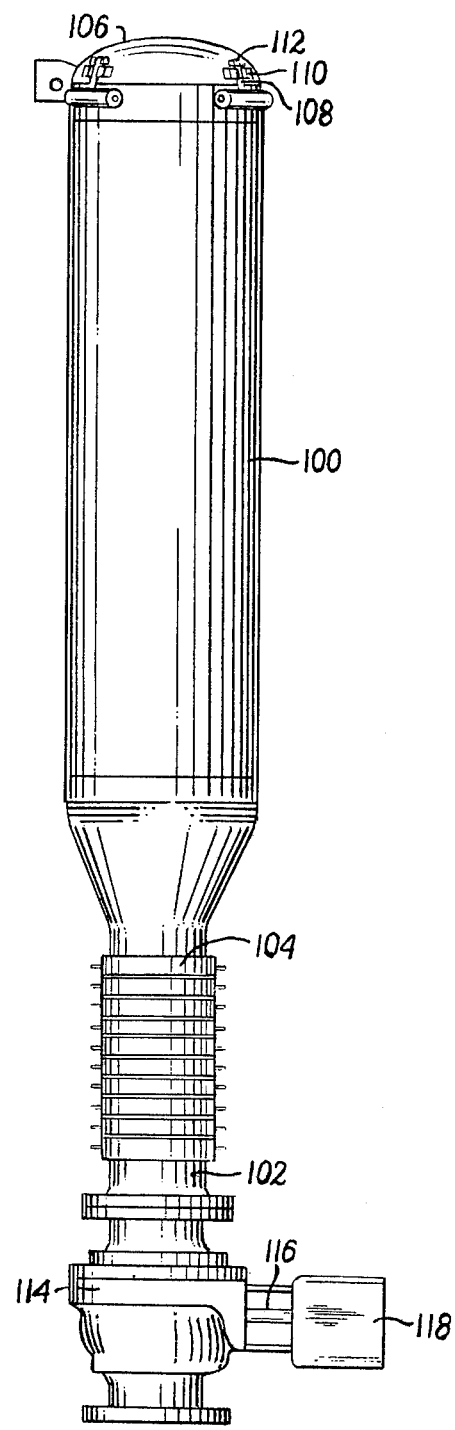
FIG. 8 is an elevation of another preferred embodiments.

FIG. 8 shows another preferred embodiment of the fragmenting or comminuting apparatus of the invention. In this embodiment a pressure vessel 100 has a lower discharge section 102 with a portion which is wrapped with electric heating elements 104.

A loading hatch 106 is hinged to the top of the pressure vessel for opening to receive the waste material and for closing to seal the upper end of the pressure vessel. The loading hatch is held in its closed, vessel-sealing position by latch bolts 108 whichare pivotally connected at one end to the pressure vessel. Each bolt 108 extends from the vessel between projections 110 on the cover and has a nut 112 threaded on the bolt and drawn against the projections. In still another embodiment (not shown) the loading hatch might be merely bolted to the pressure vessel.

The discharge end of the pressure vessel is connected to a ball valve 114. The ball valve comprises a generally spherical member having an opening diametrically therethrough of a diameter substantially corresponding to the inside diameter of the discharge section 102 of the pressure vessel. A shaft 116 connects the spherical member to an actuator 118 for rotating it from a position in which the opening therethrough is aligned with the discharge section 102 of the pressure vessel to a position in which the opening does not communicate with the discharge section. Thus, with the spherical member in the former position, the pressure vessel is substantially open to the atmosphere for rapidly discharge its content with the explosive decompression before described but, with the spherical member in the latter position, the pressure vessel is closed at its lower end for heating and pressurizing the contents of the vessel. Suitable ball valves of diameters up to at least 6 inches are commercially available from the Contromatics Corporation, a division of Litton Industries in Rockville, Connecticut.

In the operation of the apparatus shown in FIG. 8, the pressure vesssel first receives the waste material through the loading hatch 106. A quantity of water suitable for sufficiently saturating the waste material with moisture is also preferably added, much of the water collecting in the discharge section 102 of the pressure vessel about which the electric heating elements 104 extend. The upper loading hatch 106 is then closed and sealed to the pressure vessel by tighting the nuts 112 onto the projections 110. Electric energy is provided to the heating elements 104. The heating elements 104 then heat the contents of the pressure vessel (and particularly heat the water in the discharge section 102 to turn the water to steam for heating, pressurizing, and moisture saturating the contents of the pressure vessel above the discharge section, the discharge section 102 thereby forming a "boiler" within the pressure vessel).

During these initial steps of operation, the ball valve 114 has been closed with the spherical member therein not communicating with the interior of the pressure vessel. After the contents of the pressure vessel have been treated and pressurized to the desired extent by the heat and steam produced from the heating elements 104, the actuator 118 turns the spherical member to align the opening therein with the discharge section from the pressure vessel, thereby rapidly releasing the pressure from the pressure vessel for explosively decompressing its contents with the resulting fragmentation as before described.

ANOTHER METHOD

The composting procedure described above is essentially a dry process producing an essentially dry, granular, composted product mixed with the non-comminuted portions (if any) of the waste material discharged from the fragmenting apparatus particularly when the composting is accomplished in the specially designed pit structure before described. An alternative to such dry composting (or an additional step after fragmenting the waste but before or after such dry composting) is a fermentation process.

One product of the desired fermentation process is an alcohol. The resulting alcohol product, whether methal, ethyl or both, has commercial utility.

One commercial utility for such alcohol which has not heretofore been practical merely because of the cost of producing the alcohol is known to be as an additive for gasoline to reduce the knock or pre-ignition of the gasoline in internal combustion engines. Alcohol, being a non-lead compound, has advantage over tetraethyl lead heretofore well-known as such a gasoline additive in that it does not add lead to the pollutants discharged from internal combustion engines. Inasmuch as the alcohol produced by this process is derived from waste materials, the cost of collection of which need not be attributed entirely to the production of the alcohol but rather, at least in part, to the socially necessary collection of the waste materials, the cost of alcohol produced by the process will be lower than that of heretofore known processes to make the alcohol more readily acceptable as an additive for gasoline.

Although the waste material may comprise components which are readily amenable to fermentation, typical municipal waste of the type described in Table I also comprises a substantial proporation of starches, hemi-celluloses and celluloses. The latter substances may be hydrolized or converted to fermentable sugars by enzymatic or chemical agencies. Such hydrolysis will also convert fatty substances such as the fatty contents of household garbage to glycerine which is useful in the manufacture of soap as well as other products.

Hydrolization of typical municipal waste in the pressure vessel will thus yield a useful liquid which has commercial value. It will also provide an additional or optional method for disposal of such products as paper, rags, garbage, yard trimmings, brush and other polyose substances which normally comprise approximately 63 per cent of the material received from municipal collections (as indicated in Table I). The process of recovery of saccharified products from the waste by hydrolysis may be of particular interest to larger cities where the volume of waste processed through the pressure vessel is sufficiently high to economically justify the hydrolization, where markets for the hydrolized liquid are apt to exist, and where a suitable final disposal site for the biodegraded material from the composting process may be at such distances from the pressure vessel as to make transportation of even the reduced volume of the composted product from the composting site to the final disposal site unattractive.

Figure 9:
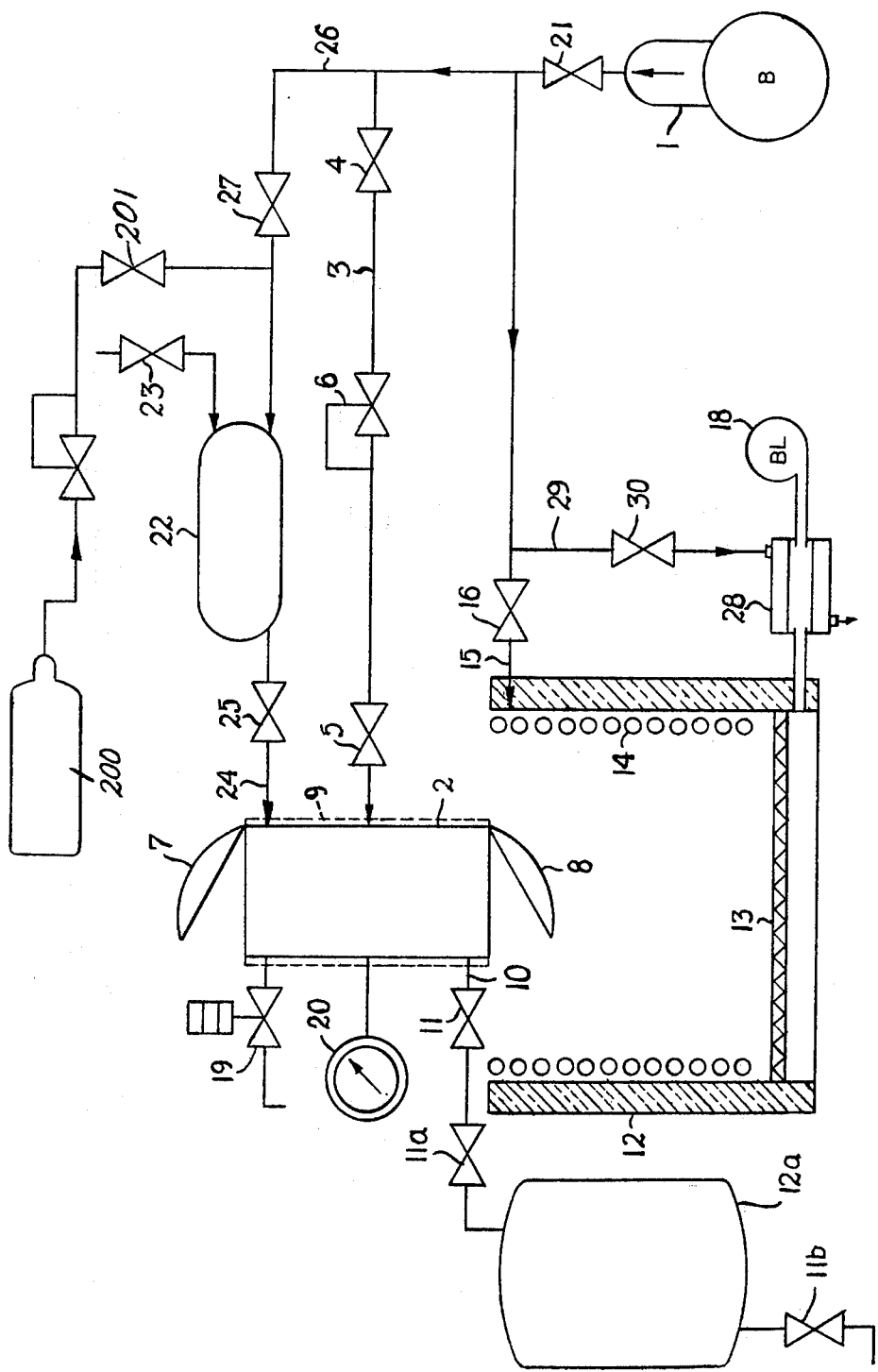
FIG. 9 is a schematic of still another preferred embodiment.

FIG. 9 shows a typical arrangement for carrying-out the hydrolysis. FIG. 9 will be recognized as a corresponding to FIG. 1 with the addition of certain components. The duplicated components will not be described again.

For the hydrolysis, the tank 22 is charged through valve 23 with a suitable concentrated acid, for example, sulfuric acid. Steam may then be admitted through valve 27 to force the acid from tank 22 into pressure vessel 2 as before described. The quantity of acid injected into the pressure vessel is preferably such as to give a concentration (with steam injection) in the steam of approximately 0.4 percent.

Alternatively, compressed air may be admitted to tank 22 from a compressed air tank 200 through valve 201. The compressed air then forces the acid into pressure vessel 2 in the same way as the steam from valve 27. Of course, the compressed air injection system may also be used, if preferred, with the apparatus described with reference to FIG. 1.

The acid converts cellulose-type materials in the waste in the pressure vessel to sugar and fatty materials, to glycerin. The acid and condensation from the steam in the pressure vessel as it is being pressurized washes the resulting sugars and glycerines to the bottom of the vessel.

As the level of liquid rises in the bottom of the pressure vessel, the liquid may be drained through drain 19 (before described) and valve 11a to a liquid receiving tank 12a. Tank 12a may be drained, as desired, into fermentation and other liquid treating apparatus (not shown).

The hydrolysis may be effectively carried out at a temperature of 300° F (166° C) and a pressure of about 6 atmospheres. The material remaining in the pressure vessel is then amenable to explosive decompression in the way before described. Non-hydrolized, moisture saturable materials will then comminute, glass shatter and closed containers rupture as before described.

After hydrolysis (but before explosive decompression), the contents of the pressure vessel may be neutralized to the extent desired by the addition of a suitable caustic soda as for instance calcium carbonate injected from the tank 22 in the way before describing for other additions to the pressure vessel 2. Heat and vapor from this neutralization will merely add to the heating and pressurizing of the vessel. When the material is then explosively decompressed, the discharged material will also be amenable to composting. Of course, acid neutralization may also be accomplished in the composting pit after explosive decompression of the material (with proper precautions for acid spattering).

We claim:

1. Apparatus for processing waste material of the type collected from municipalities to facilitate decomposition of organic components thereof, comprising:
    a pressure vessel;
    means for hydrating the waste material within the pressure vessel under pressure at tempertures sufficient to boil the moisture at atmospheric pressure;
    means for dehydrating, comminuting and expelling the waste material by sudden decompression of the vessel; and
    an open ended composting pit underlying the pressure vessel and receiving the comminuted dehydrated material expelled from the pressure vessel, the open ended composting pit having a pair of concentric spaced apart wall members surrounding the material, and a heating coil in the space between said wall members for regulating the temperature of the interior of the pit, thereby controlling the action of aerobic decomposition of the material therein.

2. Apparatus as set forth in claim 1 and additionally comprising sprinklers in the pit for spraying bacteria or other useful chemicals onto the contents discharged into the pit from the pressure vessel.

3. Apparatus as set forth in claim 1 in which the pressure vessel is supported over the pit by a deck structure having upper and lower plates for providing a passage therebetween through which stream created during the decompression of the contents of the pressure vessel is exhausted, the steam entering the space between the plates through a smaller area and exhausting through a larger area to the atmosphere for reducing the noise of exhausting the steam.

4. Apparatus as set forth in claim 1 wherein the means defining the pit comprise a wall defining the pit; a conveying device at the botton of the pit for supporting the weight of contents of the pit, agitating the lower portions thereof, and moving the lower portions thereof for discharge from the pit; and means for introducing heat and air to the contents of the pit for controlling the temperature throughout the pit whereby a most efficient action of aerobic composting of the contents takes place therein.

* * * * *

UNITED STATES PATENT OFFICE
CERTIFICATE OF CORRECTION

Patent No. 4,050,899              Dated September 27, 1977

Inventor(s) Kenneth E. Grube et al

It is certified that error appears in the above-identified patent and that said Letters Patent are hereby corrected as shown below:

First page, col. 2, last line, "7 Drawing Figures" should read --9 Drawing Figures--;
Col. 1, line 10, "beeither" should read --be either--;
   line 37, "improve" should read --improved--;
Col. 2, line 20, "explusion" should read --expulsion--;
   line 24, "pressure" should read --present--;
   line 32, "reamin" should read --remain--;
Col. 3, line 16, "indicatd" should read --indicated--;
Col. 4, line 6, "vessle" should read --vessel--;
Col. 5, line 19, "particlarly" should read --particularly--;
Col. 8, line 32, "left" should read --leaf--;
   line 51, "top" should read --stop--;
Col. 11, line 28, "through" should read --throughout--;
Col. 12, line 20, "whichare" should read --which are--;
   lines 39 & 40, "dis-charge" should read --discharging--;
   line 40, "content" should read --contents--;
Col. 13, line 2, "treated" should read --heated--;

UNITED STATES PATENT OFFICE
CERTIFICATE OF CORRECTION

Patent No. 4,050,899  Dated September 27, 1977

Inventor(s) Kenneth E. Grube et al

It is certified that error appears in the above-identified patent and that said Letters Patent are hereby corrected as shown below:

(cont'd)

Col. 14, line 4, after "as" delete "a";
        line 25, "glycerin" should read --glycerine--;
        line 46, "describing" should read --described--;
        line 61, "tempertures" should read --temperatures--; and
Col. 15, line 14, "stream" should read --steam--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks